United States Patent [19]
Wilber

[11] Patent Number: 5,883,477
[45] Date of Patent: Mar. 16, 1999

[54] PINCUSHION CONTROL CIRCUIT

[75] Inventor: James Albert Wilber, Indianapolis, Ind.

[73] Assignee: Thomson Consumer Electronics, Inc., Indianapolis, Ind.

[21] Appl. No.: 729,656

[22] Filed: Oct. 21, 1996

[51] Int. Cl.$^6$ .................................................. G09G 1/04
[52] U.S. Cl. ................................................... 315/371
[58] Field of Search ............................. 315/371; 348/746

[56] References Cited

U.S. PATENT DOCUMENTS

| | | | |
|---|---|---|---|
| 4,469,992 | 9/1984 | Favreau et al. | 317/371 |
| 4,687,972 | 8/1987 | Haferl | 315/371 |
| 5,315,266 | 5/1994 | Lorenz | 330/294 |
| 5,323,092 | 6/1994 | Helfrich et al. | 315/371 |
| 5,355,058 | 10/1994 | Jackson et al. | 315/371 |
| 5,444,338 | 8/1995 | George et al. | 315/371 |
| 5,491,389 | 2/1996 | Fernsler et al. | 315/371 |
| 5,596,250 | 1/1997 | Truskalo | 315/371 |

FOREIGN PATENT DOCUMENTS

| | | | |
|---|---|---|---|
| 24 60 478 | 6/1976 | Germany | H04N 3/22 |

OTHER PUBLICATIONS

PCT International Search Report for corresponding international application number PCT/US 97/19006.

*Primary Examiner*—Gregory C. Issing
*Attorney, Agent, or Firm*—Joseph S. Tripoli; Joseph J. Laks; Marion P. Metelski

[57] ABSTRACT

A circuit for providing an output voltage to a pincushion modulator circuit. The circuit includes an amplifier having an input for receiving an input signal. The amplifier amplifies the input signal to produce the output voltage at an output of the amplifier which is coupled to an input of the pincushion modulator circuit. A compensation path eliminates instability at frequencies above a first frequency caused by interaction between the amplifier and the pincushion modulator circuit.

22 Claims, 4 Drawing Sheets

PINCUSHION CONTROL CIRCUIT

BACKGROUND OF THE INVENTION

1. Field of the Invention

This invention relates to cathode ray tubes, and in particular, to circuits for reducing pincushion distortion.

2. Description of the Related Art

Cathode ray tubes (CRTs) typically display video images by deflecting an electron beam with a yoke having horizontal and vertical deflection coils. The electron beam is swept across the CRT face or screen to display horizontal scan lines on the face using a horizontal deflection current, typically having a sawtooth waveform, applied to the horizontal deflection yoke coil of the CRT. The CRT face is roughly planar and rectangular, rather than spherical. Accordingly, different deflection angle ranges are required to sweep a scan line across the entire width of a CRT screen at different vertical scan line locations.

Using such non-spherical CRT faces thus gives rise to display artifacts known as pincushion distortion. Referring now to FIG. 1, there is shown a CRT screen 100 illustrating such pincushion distortion. At a constant peak-to-peak magnitude of the horizontal deflection current that causes the electron beam to sweep across the CRT screen, scan lines 121 and 123, near the top and bottom edges of screen 100, respectively, have a different length than scan lines closer to the vertical center, such as center scan line 122, in part because of the different deflection angle ranges required for different scan lines. This causes a distortion such that a rectangle to be displayed on screen 100 would have its vertical edges squeezed inwards, so that they were narrowest near the vertical center of screen 100, as illustrated by curves 112.

Such pincushion distortion is typically addressed by a pincushion modulator circuit that modulates the deflection current driving the horizontal deflection yoke coil so that it is decreased as scan lines are farther from vertical center, and increased for scan lines closer to vertical center. The pincushion modulator circuit, sometimes called a pin modulator circuit or diode modulator circuit, typically modulates an input sawtooth current in accordance with a modulation voltage having a parabolic-shaped waveform provided by a pincushion control circuit. Pincushion distortion, pincushion modulator circuits, and related aspects of CRT systems and pincushion correction are described in K. Blair Benson, *Television Engineering Handbook* (New York: McGraw Hill Book Co., 1986), at pages 13.175 to 13.181.

Different CRTs can require deflection currents of different magnitude ranges to drive the horizontal deflection yoke coil. Different deflection current magnitude ranges can require different modulation voltage ranges. For a given pincushion control circuit, a change in the CRTs can thus require modulation voltages having a parabolic waveform with accordingly different peak-to-peak magnitudes generated by the circuit. For example, for a given pincushion control circuit, changing the faceplate geometry of the CRT can require larger deflection currents, which thus requires modulation voltages having a parabolic waveform with larger peak-to-peak magnitudes. One problem with such pincushion distortion correction systems is that parabolic voltage waveforms may require magnitudes larger than the maximum output modulation voltage of the control circuit. For example, if an internally compensated operational amplifier is utilized as part of the output stage of the control circuit, its output voltage will be limited to the supply voltage of the operational amplifier (sometimes referred to as the supply voltage rails of the operational amplifier). This may require changing the circuitry, for example to utilize an operational amplifier having a larger supply voltage.

SUMMARY OF THE INVENTION

A circuit for providing an output voltage to a pincushion modulator circuit. The circuit includes an amplifier having an input for receiving an input signal. The amplifier amplifies the input signal to produce the output voltage at an output of the amplifier which is coupled to an input of the pincushion modulator circuit. The circuit further includes a means for stabilizing the circuit at frequencies above a first frequency caused by interaction between the amplifier and the pincushion modulator circuit.

A pincushion correction circuit according to inventive arrangements described herein comprises: a pincushion modulator; an amplifier for an input signal supplied by the amplifier to the pincushion modulator, the pincushion modulator and the amplifier interacting with a characteristic instability above a first frequency; and, means for stabilizing the interacting of the pincushion modulator and the amplifier at frequencies above the first frequency.

The stabilizing means may comprise a compensation path having a gain that dominates a main loop path of the circuit at frequencies above the first frequency. The stabilizing means may comprise a compensation path that dominates the main loop path at frequencies above a crossover frequency, wherein the crossover frequency is less than or equal to the first frequency. The compensation path may comprise a feedback path for the amplifier. The crossover frequency may be approximately 2 KHz and the first frequency may be approximately 20 KHz.

The voltage may have a parabolic waveform and the input signal may have a parabolic voltage waveform. The amplifier may comprise: an operational amplifier having an input for receiving the input signal and an output; and, an active element coupled between the output of the operational amplifier and the input of the pincushion modulator circuit, wherein the operational amplifier controls the active element. The active element may comprise a transistor having base, collector, and emitter terminals, wherein the transistor is coupled at its collector terminal to the input of the pincushion modulator circuit and to the input of the operational amplifier through a feedback resistor, and at its base terminal to the output of the operational amplifier.

The operational amplifier may have a non-inverting input for receiving the input signal and an inverting input; and, the stabilizing means may comprise a capacitor coupled between the output of the operational amplifier and the inverting input of the operational amplifier. The stabilizing means may further comprise a first resistor coupled between a power supply and the inverting input of the operational amplifier and a second resistor coupled between the inverting input of the operational amplifier and ground.

The circuit may further comprise: an input resistor coupled between the non-inverting input of the operational amplifier and the input signal; a third resistor coupled between the output of the operational amplifier and the base terminal of the transistor; and, a fourth resistor coupled between the emitter of the transistor and ground.

According to a feature of the inventive arrangements described herein, a circuit for providing a voltage to a pincushion modulator circuit comprises: an operational amplifier having an input for receiving an input signal and an output; and, an active element coupled to the output of the operational amplifier for providing the voltage with a peak magnitude which exceeds in magnitude a supply voltage rail applied to the operational amplifier.

The active element may comprise either a bipolar-junction transistor or a field-effect transistor. The bipolar-junction transistor may be coupled at its collector terminal to the input of the pincushion modulator circuit and to the input of the operational amplifier, and at its base terminal to the output of the operational amplifier, wherein the operational amplifier controls the active element. The field-effect transistor may be coupled at its drain terminal to the input of the pincushion modulator circuit and to the input of the operational amplifier, and at its gate terminal to the output of the operational amplifier, wherein the operational amplifier controls the active element.

The circuit may further comprise a capacitance coupled from the output of the operational amplifier to an inverting input of the operational amplifier, wherein the capacitance may provide a compensation path having a gain that dominates a main loop path of the circuit at frequencies above a first frequency. The capacitance may comprise a compensation path that dominates the main loop path at frequencies above a crossover frequency, wherein the crossover frequency is less than or equal to the first frequency. The crossover frequency may be approximately 2 KHz and the first frequency may be approximately 20 KHz. The capacitance may stabilize the circuit at frequencies above a first frequency caused by interaction between the operational amplifier and an "S"-shaping capacitance of the pincushion modulator circuit.

The above, and other features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
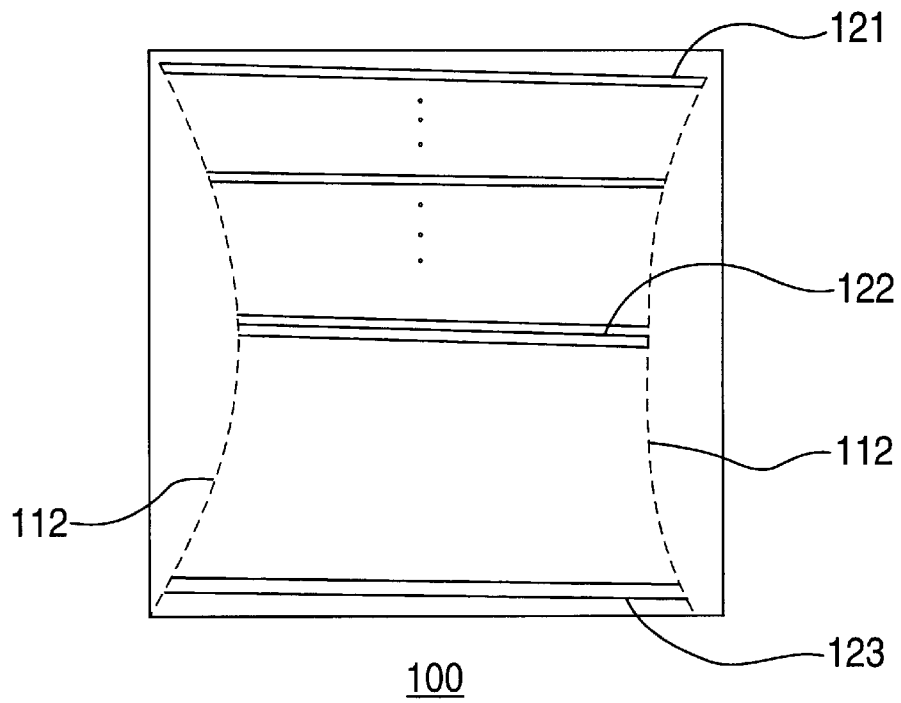
FIG. 1 depicts a CRT screen illustrating a pincushion distortion effect.
Figure 4:
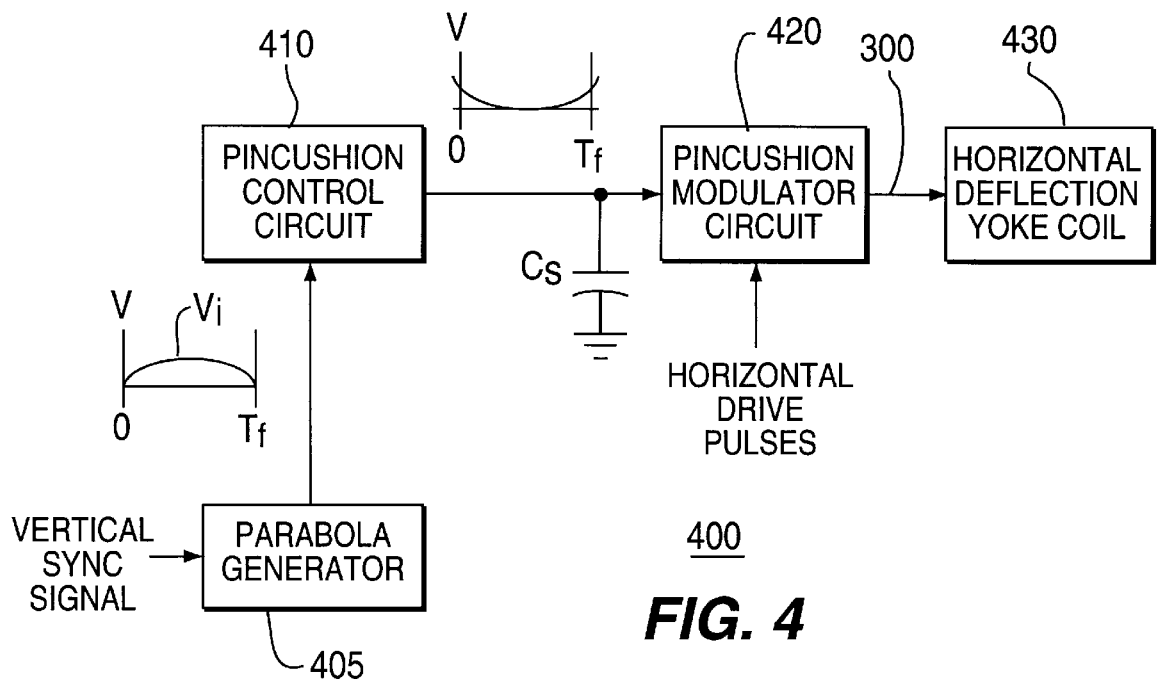
FIG. 4 is a block diagram of a pincushion distortion correction system in accordance with the inventive arrangements described herein.

In FIG. 4, a horizontal deflection yoke coil 430 of a CRT receives a roughly linearly increasing, or ramping, horizontal deflection current for each scan line to sweep the electron beam across a screen 100 of the CRT, as shown in FIG. 1. For example, in FIG. 2 there is shown a sawtooth waveform 200 of a horizontal deflection current applied to the horizontal deflection yoke coil 430 of FIG. 4. The waveform 200 has current ramps 221, 222 and 223 associated with selected scan lines 121, 122 and 123, respectively, of CRT screen 100. For a system in which there are 525 scan lines per field, for example, 525 current sawtooth wave peaks are received by horizontal deflection yoke coil 430, one ramp per scan line. Each scan line has a period of $T_P$. Thus, for instance, current ramp 221 of current sawtooth wave 200 rises from $-I_1$ to $+I_1$ during the interval from t=0 to $t=T_P$, to cause scan line 121 to be displayed on screen 100. Ramps 222 and 223 similarly control the display of scan lines 122 and 123, respectively. However, as described previously, if the relative peak-to-peak magnitude of each current ramp of wave 200 is constant, the pincushion distortion illustrated by curves 112 in FIG. 1 will result. This distortion is minimized by increasing the peak-to-peak magnitude of current ramps for scan lines that would otherwise be distorted. Therefore, current sawtooth wave 200 is modulated for pincushion correction.

Figure 2:
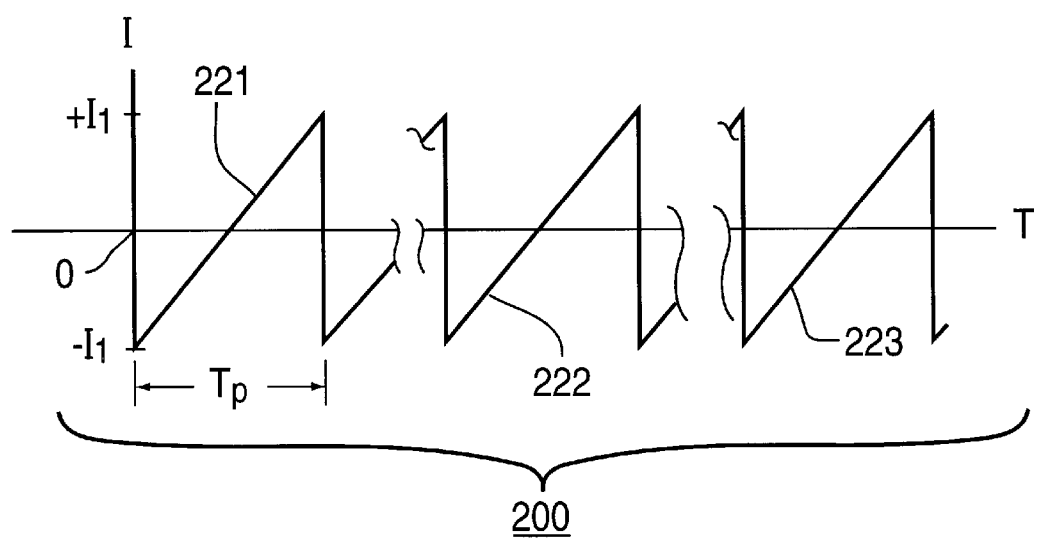
FIG. 2 depicts sawtooth wave current ramps for selected scan lines of a CRT having a screen as shown in FIG. 1.
Figure 3:
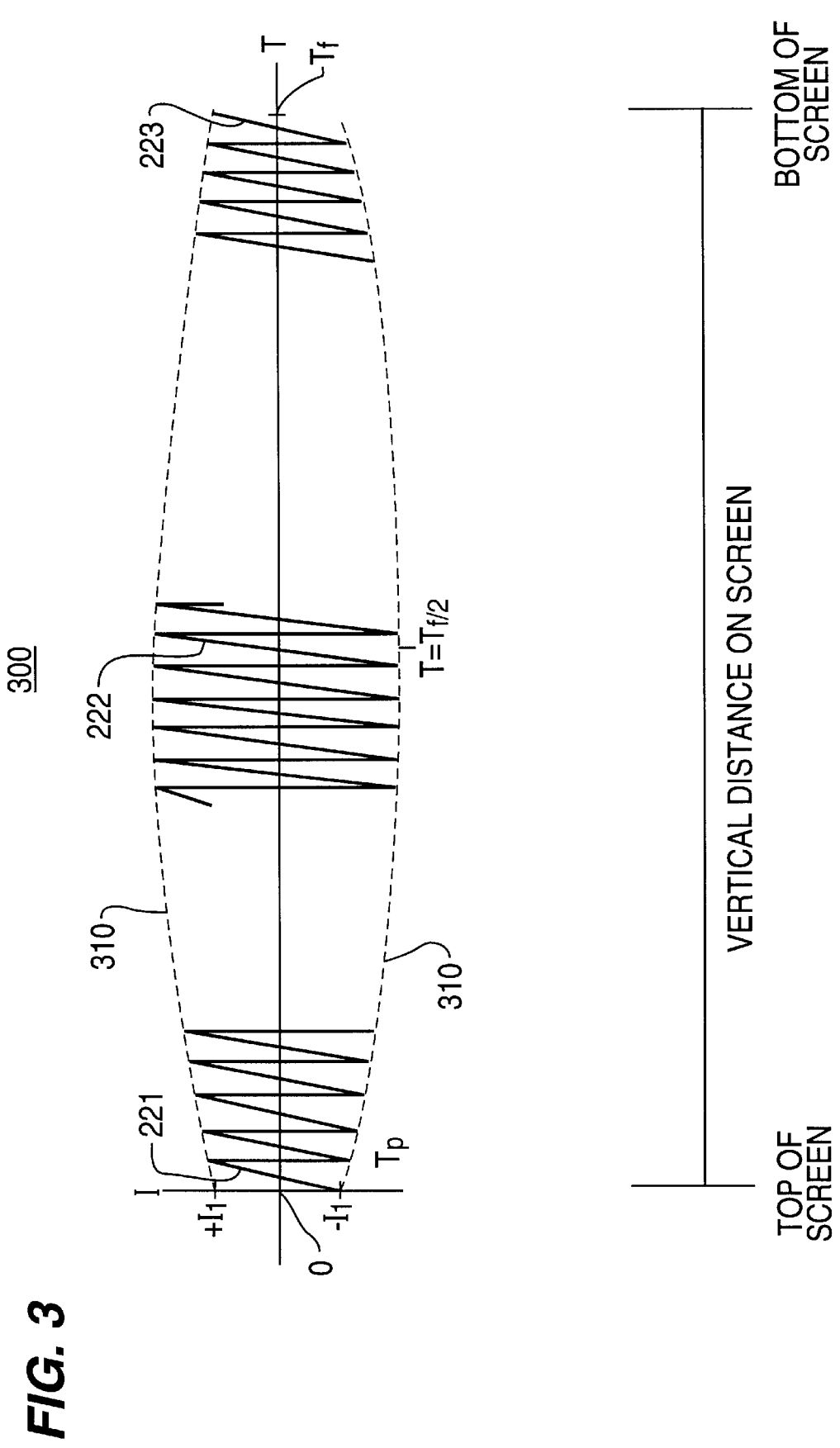
FIG. 3 depicts the current sawtooth wave of FIG. 2, modulated in accordance with the inventive arrangements described herein to reduce pincushion distortion.

Referring now to FIG. 3, there is shown current sawtooth wave 200 of FIG. 2, modulated in accordance with an inventive arrangement to provide modulated current sawtooth wave 300. The time to display an entire field is equal to $T_f$. As illustrated, modulated current sawtooth wave 300 comprises a plurality of ramps for one field of scan lines, with one ramp for each scan line. As can be seen, the peak-to-peak amplitude of each current ramp increases for scan lines closer to the vertical center of screen 100, in accordance with parabolic envelope 310.

The frequency of displaying scan lines (and corresponding time $T_P$) depends on a variety of factors, such as the vertical rate of displaying a new field of scan lines (typically approximately 59.94 fields per second), and the number of scan lines per field. For example, the "1H" scan frequency of approximately 15,734 Hz may be utilized in a system having 262.5 scan lines per field, with two fields per frame and approximately 59.94 fields per second. The "2H" scan frequency of approximately 31,468 Hz may be utilized for 525 scan lines per field at approximately 59.94 fields per second (with a field equal to a frame).

Referring again to FIG. 4, there is shown a block diagram of a pincushion distortion correction system 400 in accordance with the inventive arrangement. System 400 comprises pincushion control circuit 410, a linear-type pincushion modulator circuit 420, horizontal deflection yoke coil 430, and voltage parabola generator 405. A capacitor $C_S$ provides "S" shaping for pincushion modulator circuit 420. Capacitor $C_S$ is typically included as part of pincushion modulator circuit 420, but is shown separately to facilitate understanding of pincushion correction system 400.

Voltage parabola generator 405 provides a parabolic voltage $V_i$ over the period $T_f$ to pincushion control circuit 410. Parabolic generator 405 also receives a vertical sync signal, used to generate the voltage parabola $V_i$ at the beginning of a field of scan lines. The voltage parabola $V_i$ has, in one embodiment, a 2.8 V maximum voltage and a 1.6 V minimum voltage, and thus a 1.2 V peak-to-peak voltage range. Voltage parabola $V_i$ has an inverse shape with respect to the parabolic voltage generated by pincushion control circuit 410, such that voltage parabola $V_i$ is at a maximum voltage magnitude when the voltage parabola of pincushion control circuit 410 is at a minimum voltage magnitude, and vice-versa.

Pincushion modulator circuit 420 receives a plurality of horizontal drive pulses, one pulse for each horizontal scan line to be generated by horizontal deflection yoke coil 430. Pincushion modulator circuit 420 also receives a parabolic voltage output from pincushion control circuit 410, and, utilizing these inputs, generates a modulated sawtooth current of the form depicted as modulated current sawtooth wave 300 of FIG. 3, to drive horizontal deflection yoke coil 430. The parabolic modulation envelope 310 is derived using the parabolic voltage output from pincushion control circuit 410. A comparison of FIGS. 3 and 4 shows that, when the magnitude of the parabolic voltage output from pincushion control circuit 410 is at a maximum, the magnitude of the parabolic modulation envelope 310 is at a minimum, and vice-versa.

Figure 5:
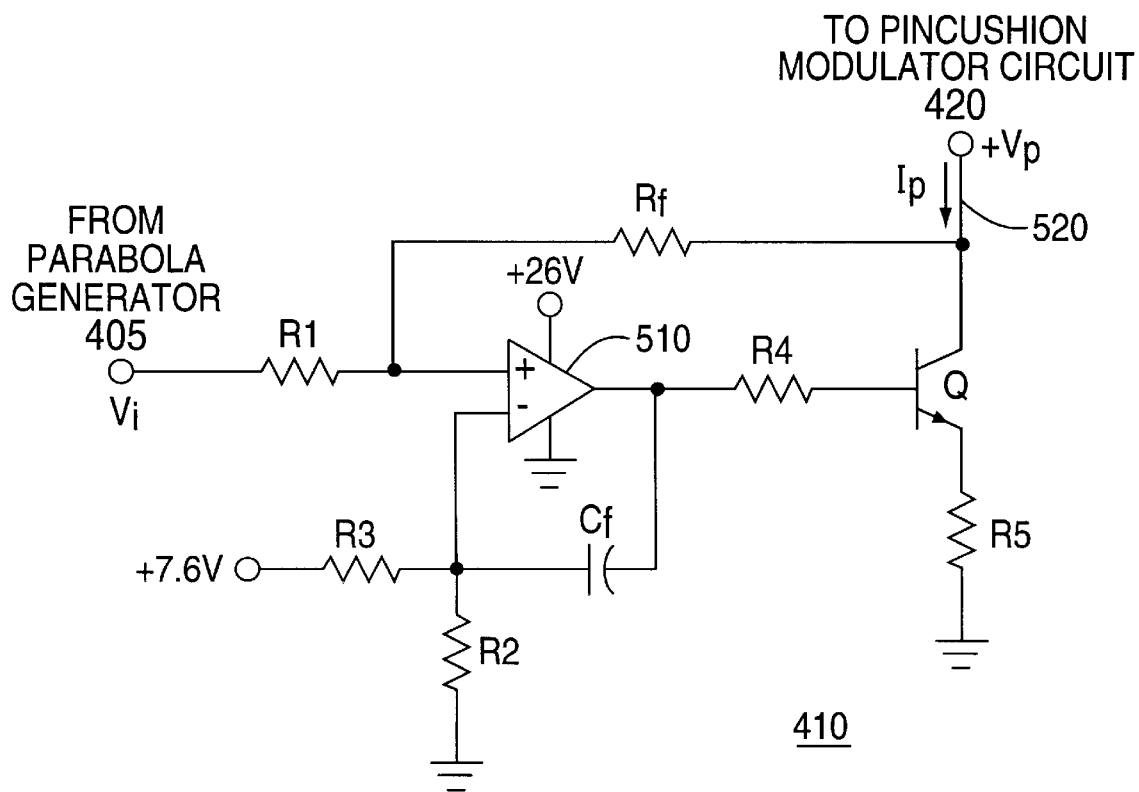
FIG. 5 is a schematic diagram of a the pincushion control circuit of FIG. 4.

Referring now to FIG. 5, there is shown a schematic diagram of pincushion control circuit 410 of FIG. 4. Pincushion control circuit 410 comprises resistors $R_1$, $R_2$, $R_3$, $R_4$ and $R_5$, feedback resistor $R_f$, internally compensated operational amplifier 510, transistor Q, and feedback capacitor $C_f$. Operational amplifier 510 is coupled at its non-inverting input to the junction of resistors $R_1$ and $R_f$, and at its inverting input to the junction of resistors $R_3$ and $R_2$ and capacitor $C_f$. The other terminal of resistor $R_3$ is coupled to a first power supply, which supplies a dc voltage of, for example, approximately 7.6 V. The other terminal of resistor $R_2$ is grounded. The output of operational amplifier 510 is coupled to the base of transistor Q through resistor $R_4$. The other terminal of capacitor $C_f$ is coupled to the output of operational amplifier 510. Resistor $R_f$ is coupled between the non-inverting input of operational amplifier 510 and the collector of transistor Q. The emitter of transistor Q is coupled to ground through resistor $R_5$. The non-inverting input of operational amplifier 510 is also coupled to signal source $V_i$ from voltage parabola generator 405 through resistor $R_1$. The power supply inputs of operational amplifier 510 are coupled between a second power supply, which supplies a dc voltage of, for example, approximately 26 V, and ground. During operation, current $I_P$ flows from pincushion modulator circuit 420 into pincushion control circuit 410 at node 520.

In one embodiment, the components of circuit 410 have the following values: $R_1$=10 KΩ; $R_2$=40.2 KΩ; $R_3$=28 K Ω; $R_4$=1 KΩ; $R_5$=1 Ω (1W); $R_1$=120 K Ω; $C_f$=0.27 μF. Q is preferably a power Darlington npn transistor of type TIP122. Operational amplifier 510 is preferably a type LM358. Resistors $R_1$ and $R_f$ determine the closed loop voltage gain of control circuit 410. Resistor $R_4$ provides for current protection of both operational amplifier 510 and transistor Q. Resistor $R_5$ sets the gain of the transistor Q stage. Resistors $R_2$ and $R_3$, in conjunction with the 7.6 V voltage applied to $R_3$, are configured to set the desired DC operating point of output voltage $V_P$ by providing a DC offset voltage to the inverting input of operational amplifier 510, to which the voltage at the non-inverting input is compared.

Pincushion control circuit 410 operates as follows. A parabolic voltage over the period $T_f$, from the first scan line 121 to the last scan line 123 in a field, received from voltage parabola generator 405, is applied to the non-inverting input of operational amplifier 510 through resistor $R_1$. In normal operation, a parabolic voltage $V_P$ of opposite polarity and corresponding to the parabolic voltage from voltage parabola generator 405 is generated at node 520. The output voltage $V_P$ at node 520 has a parabolic waveform that pincushion modulator circuit 420 uses to modulate the current sawtooth wave output to yoke coil 430, as previously described. The magnitude of voltage $V_P$ at node 520 varies in accordance with the current flowing into the base of transistor Q through resistor $R_4$, which is a function of the voltage output from operational amplifier 510. Operational amplifier 510 develops an error signal to drive transistor Q, so that $V_P$ tracks the parabolic voltage waveform shape of the reference parabolic voltage provide by generator 405, plus the DC offset voltage provided by resistors $R_3$ and $R_2$ and the 7.6 V source. Operational amplifier 510 combined with transistor Q and related components thus provide an amplifier, having an input for receiving an input signal $V_i$, wherein the amplifier is for amplifying the input signal $V_i$ to produce the output voltage $V_P$ at an output of the amplifier, for example node 520 at the collector electrode of transistor Q, which is coupled to "S" capacitor $C_S$.

The output voltage $V_P$ is limited only by the breakdown characteristics of transistor Q. In one embodiment, $V_P$ may rise to voltages on the order of 100 V before breakdown occurs, even though the supply voltage of operational amplifier 510 is 26 V.

Figure 7:
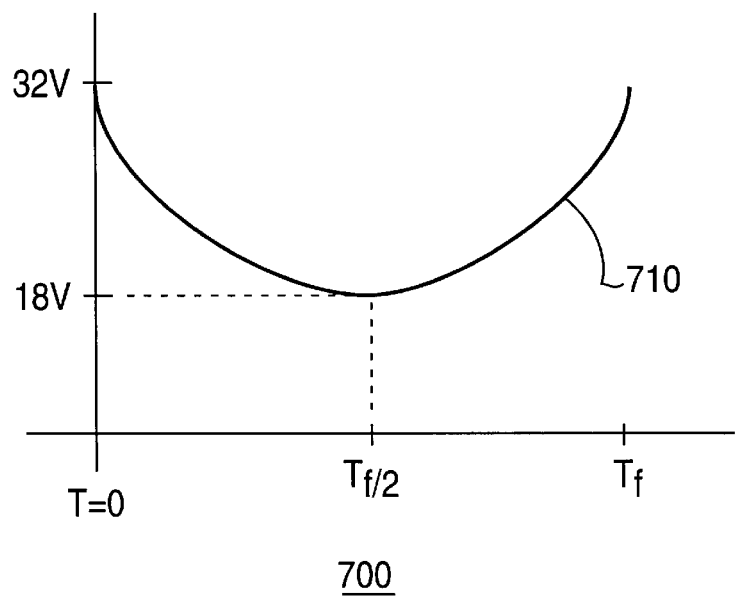
FIG. 7 is a graph illustrating a parabolic voltage output by the pincushion control circuit of FIG. 5.

Referring now to FIG. 7, there is shown graph 700 illustrating a parabolic voltage 710 output by pincushion control circuit 410, in accordance with the inventive arrangement. As shown, parabolic voltage 710 has a peak-to-peak value of 14 V and a maximum voltage of 32 V. Thus, pincushion control circuit 410 provides an output voltage of up to 32 V for parabolic voltage 710, even though the supply voltage of operational amplifier 510 is 26 V.

Referring now to FIG. 5, several signal paths may be defined to explain the operation of circuit 410. The main feedback path of circuit 410 is the feedback path from the output of operational amplifier 510, through resistor $R_4$, transistor Q, and resistor $R_f$, to its non-inverting input, excluding operational amplifier 510 itself. The main loop path of circuit 410 is the main feedback path plus operational amplifier 510. The main loop path enables amplification of the input parabolic voltage at $V_i$ to produce the amplified output parabolic voltage at $V_P$. The compensation path of circuit 410 is the path from the output of operational amplifier 510, through capacitor $C_f$ to its inverting input, excluding operational amplifier 510 itself. The compensation loop path is the compensation path plus operational amplifier 510.

Figure 6:
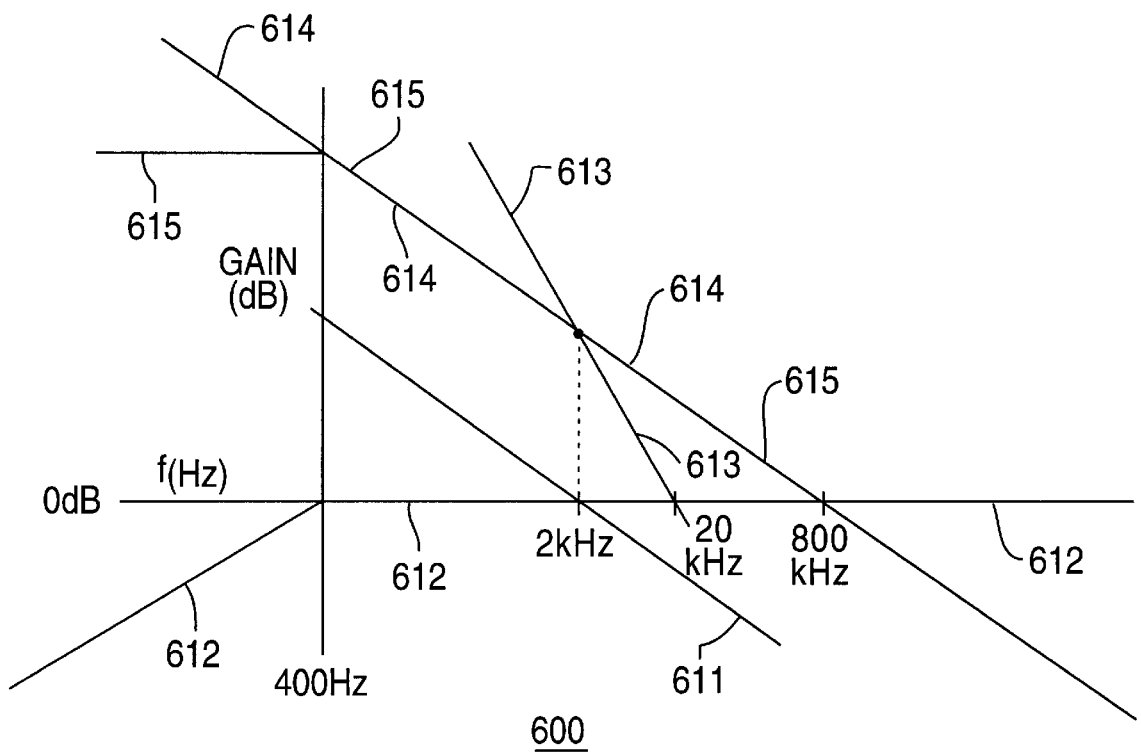
FIG. 6 is a graph illustrating gain versus frequency characteristics of the pincushion control circuit of FIG. 5.

Referring now to FIG. 6, there is shown graph 600 illustrating gain versus frequency characteristics 611, 612, 613, 614, and 615 of signal paths of pincushion control circuit 410, in accordance with the inventive arrangement. Gain curve 611 plots the gain versus frequency of the main feedback path of circuit 410, and gain curve 613 plots the gain versus frequency of the main loop path of circuit 410. Gain curve 612 plots gain of the compensation path of circuit 410, and gain curve 615 plots the gain of the compensation loop path of circuit 410. Gain curve 614 plots the gain of operational amplifier 510 as a function of frequency.

Operational amplifiers such as operational amplifier 510 configured as shown typically have an internal pole. For example, an operational amplifier such as type LM358 has a pole at about 3 Hz. Thus, as illustrated by gain curve 614 of operational amplifier 510, this operational amplifier pole causes gain curve 614 to cross the 0 dB axis at about 800 KHz. However, a second pole associated with "S" capacitor $C_S$ affects the operation of the main loop path of circuit 410, and causes instability, or oscillation, at an instability frequency of approximately 20 KHz. The operational amplifier pole and second pole of "S" capacitance $C_S$ combine to cause gain curve 613 of the main loop path to have a slope twice as steep as the slope of gain curve 611 of the main feedback path. Because of the relatively steep slope at which gain curve 613 declines, gain curve 613 crosses the 0 dB axis at the instability frequency 20 KHz. Thus, at 20 KHz, when the gain of the main loop path reaches unity (0 dB), instability in the form of oscillation will be introduced into the main loop path. However, this instability will be introduced only if the gain of the main loop path is dominant at this frequency. Therefore, as described below, capacitor $C_f$ provides a compensation path to counteract the effects of the second pole of pincushion control circuit 420 and thus to compensate for this instability. This compensation path is provided so that its gain dominates the gain of the main loop path for at least 20 KHz and higher frequencies, to prevent the dominant gain from falling below 0 dB at the instability frequency.

As illustrated, gain curve 611 of the main feedback path crosses the 0 dB axis at approximately 2 KHz. The gain 612 of the compensation path has a pole at 400 Hz, as illustrated, and, at frequencies greater than 2 KHz, the gain curve 612 of the compensation path dominates the gain curve 611 of the main feedback path. In conjunction with capacitor $C_f$, resistors $R_2$ and $R_3$, which are in parallel for AC signals, set the 400 Hz pole for gain curve 612 (as well as for gain curve 615). This pole is illustrated by the bends in gain curves 612 and 615 at the 400 Hz axis.

The dominance of the gain of the compensation path through compensation capacitor $C_f$ may also be illustrated with respect to gain curves 615 and 613, which plot the gains of the compensation loop path and the main loop path, respectively. As illustrated, before the compensation path pole at 400 Hz, gain curve 615 of the compensation loop path is horizontal. After 400 Hz, gain curve 615 of the compensation loop path slopes downward at a slope equal to that of operational amplifier gain curve 614 and main feedback path gain curve 611. Thus, for frequencies greater than 400 Hz, operational amplifier gain curve 614 and compensation loop path gain curve 615 are equal. As illustrated in FIG. 6, main loop path gain curve 613 intersects compensation loop path gain curve 615 at 2 KHz, so that gain curve 615 dominates gain curve 613 at frequencies greater than 2 KHz.

This domination of the compensation path, beginning at 2 KHz, ensures adequate stability of the main loop path because the gain of the compensation path begins to dominate before the 20 KHz frequency at which instability would begin. Capacitor $C_f$ thus provides a dominant feedback path at higher frequencies, such that it removes the effect of the pole of "S" capacitor $C_S$ that would otherwise cause oscillation when combined with the pole of operational amplifier 510. The compensation path provided by capacitor $C_f$ thus constitutes a means for reducing instability at frequencies above a first frequency, for example 20 KHz, caused by interaction between operational amplifier 510 and "S" capacitor $C_S$.

As will be appreciated, in alternative embodiments, suitable active elements other than npn power transistors, such as field-effect transistors (FETs), may be utilized with the inventive arrangement.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A pincushion correction circuit, comprising:
    a pincushion modulator;
    an amplifier circuit for a pincushion correction signal applied to the pincushion modulator, the amplifier circuit comprising a transistor having an inverting output coupled to the pincushion modulator; and,
    means for stabilizing the amplifier circuit at frequencies above a first frequency defined by an interaction between the pincushion modulator and the amplifier circuit.

2. The circuit of claim 1, wherein the pincushion modulator is of the linear type.

3. The circuit of claim 1, wherein the stabilizing means comprises a feedback compensation path of the amplifier having a gain that dominates a main feedback loop path of the circuit at frequencies above the first frequency.

4. The circuit of claim 1, wherein the stabilizing means comprises a feedback compensation path that dominates the main feedback loop path at frequencies above a crossover frequency, wherein the crossover frequency is less than or equal to the first frequency.

5. The circuit of claim 4, wherein the crossover frequency is approximately 2 KHz and the first frequency is approximately 20 KHz.

6. The circuit of claim 1, wherein the pincushion correction signal has a parabolic voltage waveform.

7. A pincushion correction circuit, comprising:
    a pincushion modulator;
    a first amplifier stage having a first input terminal for receiving a pincushion correction signal, a second input terminal, and an output terminal;
    a second amplifier stage coupled between the output terminal of the first amplifier stage and an input of the pincushion modulator, wherein the second amplifier stage provides further voltage amplification for the pincushion correction signal beyond that which is provided by the first amplifier stage;
    a main feedback loop path coupling an output terminal of the second amplifier stage to the first input terminal of the first amplifier stage; and
    a feedback compensation path coupled from the output terminal of said first amplifier stage to said second input terminal, wherein the gain of said feedback compensation path dominates the gain of said main feedback loop path above a first frequency defined by an interaction between the pincushion modulator and the first amplifier stage.

8. The circuit of claim 7, wherein
    the first amplifier stage comprises an operational amplifier having a non-inverting input for receiving the pincushion correction signal and an inverting input.

9. A pincushion correction circuit, comprising:
    a pincushion modulator;
    an operational amplifier having a first input terminal for receiving a pincushion correction signal, a second input terminal, and an output terminal; and
    a capacitor coupled between the output terminal of the operational amplifier and the second input terminal of the operational amplifier for stabilizing the operational amplifier at frequencies above a first frequency defined by an interaction between the pincushion modulator and the operational amplifier; and
    a transistor coupled at an inverting output terminal to the input of the pincushion modulator and to the first input terminal of the operational amplifier through a feedback resistor, and at a control terminal to the output terminal of the operational amplifier.

10. An amplifier arrangement for amplifying a parabolic input waveform to provide a parabolic output waveform to a pincushion modulator, the amplifier arrangement comprising:
    a non-inverting input terminal for receiving the input waveform, an inverting input terminal, and an output terminal; and,
    a transistor having base, collector, and emitter terminals, wherein the transistor is coupled at its collector terminal to the input of the pincushion modulator and to the non-inverting input terminal of the operational amplifier through a feedback resistor, and at its base terminal to the output terminal of the operational amplifier; and feedback means comprising a capacitor coupled between the output terminal of the operational amplifier and the inverting input terminal of the operational amplifier for providing a dominant feedback path for said operational amplifier at frequencies above a first frequency defined by an interaction between the pincushion modulator and the operational amplifier.

11. A circuit for providing a voltage to a pincushion modulator circuit, the circuit comprising:

an operational amplifier having a first input terminal for receiving a parabolic signal, a second input terminal, and an output terminal;

a transistor amplifier having control and output terminals, wherein the transistor amplifier is coupled at its output terminal to the input of the pincushion modulator circuit and to the first input terminal of the operational amplifier, and at its control terminal to the output terminal of the operational amplifier, wherein the transistor amplifier provides the parabolic voltage with a peak magnitude which exceeds in magnitude a supply voltage rail applied to the operational amplifier; and a feedback compensation path coupling the output terminal of the operational amplifier to the second input, said feedback compensation path providing a dominant feedback path for frequencies above a predetermined frequency defined by a n interaction between said operational amplifier and said pincushion modulator circuit.

12. The circuit of claim 11, wherein the transistor amplifier comprises a bipolar junction transistor.

13. The circuit of claim 11, wherein the transistor amplifier comprises a field effect transistor.

14. The circuit of claim 11, wherein the feedback compensation path has a gain that dominates a main feedback loop path at frequencies above said predetermined frequency, said main feedback loop path coupled from the output terminal of the transistor amplifier to the first input terminal of the operational amplifier.

15. The circuit of claim 14, wherein the feedback compensation path dominates the main feedback loop path at frequencies above a crossover frequency, wherein the crossover frequency is less than or equal to the first frequency.

16. The circuit of claim 15, wherein the crossover frequency is approximately 2 KHz and the first frequency is approximately 20 KHz.

17. The circuit of claim 11, wherein the feedback compensation path provides a dominant feedback for said operational amplifier at frequencies above a first frequency which is defined by an interaction between a pole associated with the operational amplifier and a pole associated with an "S"-shaping capacitance of the pincushion modulator circuit.

18. A pincushion correction circuit, comprising:

a pincushion modulator;

an amplifier circuit having first and second input terminals and an output terminal coupled to the pincushion modulator;

a main feedback loop path coupled from the pincushion modulator to the first input terminal of the amplifier circuit; and a feedback compensation path coupled from an output of the amplifier circuit to the second input terminal of the amplifier circuit, the gain of said feedback compensation path dominating the gain of said main feedback loop path to prevent the gain of said amplifier circuit from falling below unity at a predetermined frequency defined by an interaction between said pincushion modulator and said amplifier circuit.

19. The pincushion correction circuit of claim 18, wherein an interaction between the pincushion modulator and the amplifier circuit creates a tendency toward instability in the amplifier circuit at frequencies not less than said predetermined frequency.

20. The pincushion correction circuit of claim 19, wherein the feedback compensation path tends to eliminate instability in the amplifier circuit.

21. The pincushion correction circuit of claim 20, wherein the feedback compensation path has a gain which dominates the main feedback loop path at frequencies above a crossover frequency, wherein the crossover frequency is less than or equal to the first frequency.

22. The pincushion correction circuit of claim 21, wherein:

the amplifier circuit comprises an operational amplifier having an internal pole;

the pincushion correction circuit further comprising:

a transistor having an input electrode coupled to an output terminal of the operational amplifier; and an S-shaping capacitor associated with the pincushion modulator and coupled to an output electrode of the transistor, the S-shaping capacitor possessing a characteristic pole;

wherein the tendency toward instability results from an interaction between the internal pole of the operational amplifier and the characteristic pole of the S-shaping capacitance.

* * * * *

UNITED STATES PATENT AND TRADEMARK OFFICE
CERTIFICATE OF CORRECTION

PATENT NO. : 5,883,477
DATED : March 16, 1999
INVENTOR(S) : James A. Wilber

It is certified that error appears in the above-identified patent and that said Letters Patent is hereby corrected as shown below:

In claim 10, column 8, line 63, before "a non-inverting", add the words --an operational amplifier having--

Signed and Sealed this

Twenty-seventh Day of July, 1999

Attest:

Q. TODD DICKINSON

*Attesting Officer*  *Acting Commissioner of Patents and Trademarks*